Patented Feb. 17, 1931

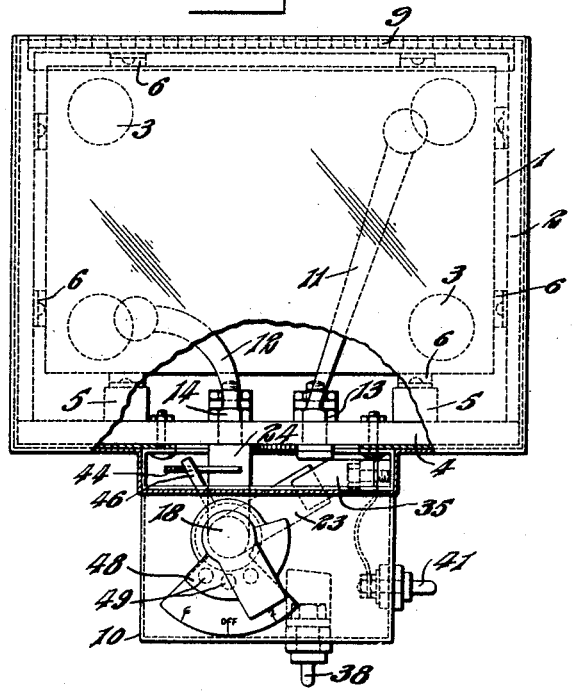

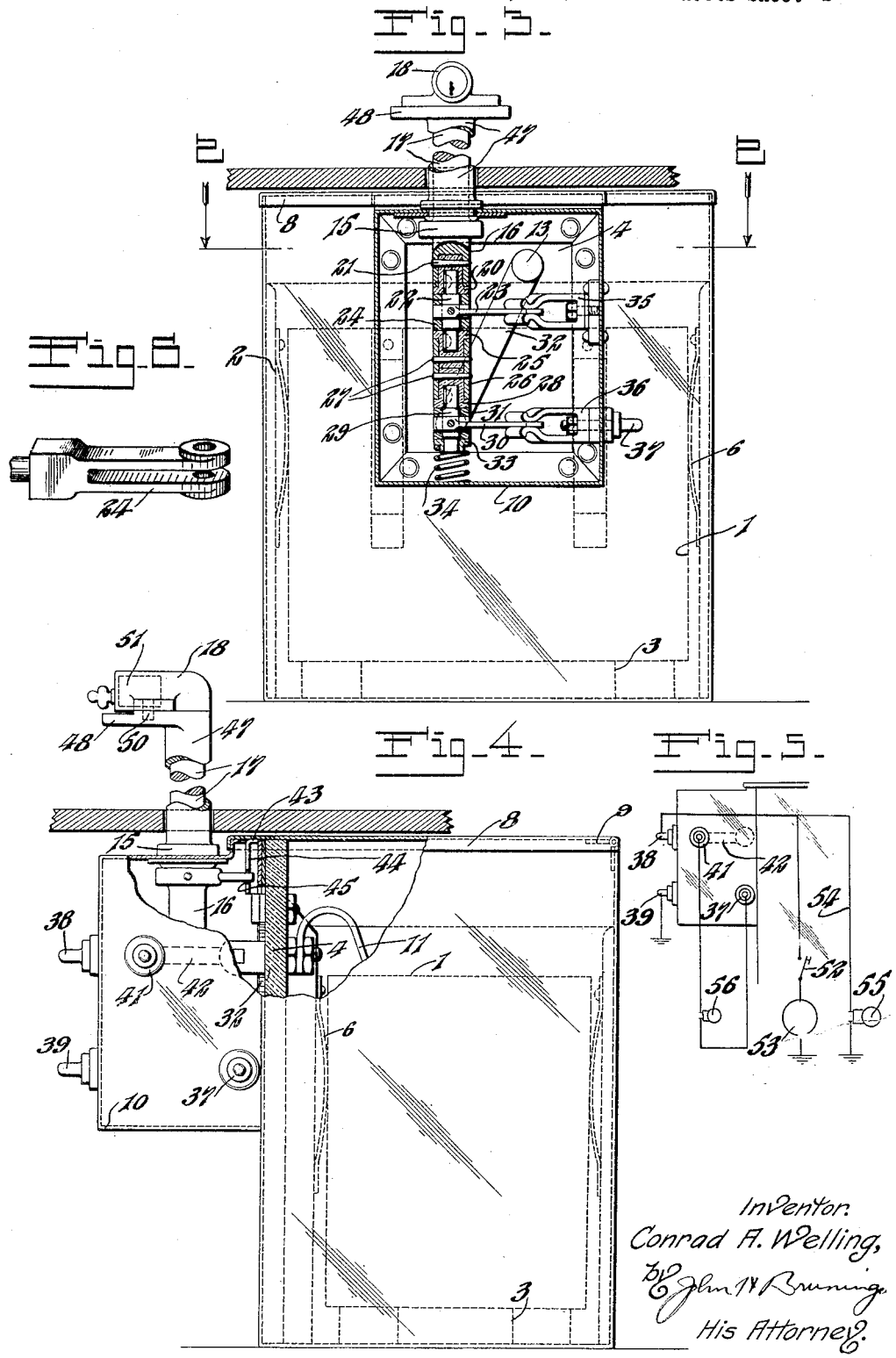

1,793,033

UNITED STATES PATENT OFFICE

CONRAD A. WELLING, OF ST. LOUIS, MISSOURI

PROTECTIVE DEVICE FOR AUTOMOBILES

Application filed December 12, 1923. Serial No. 680,220.

This invention relates to electrical systems for automobiles, and more particularly to means for protecting the circuits against tampering therewith by unauthorized persons.

One of the objects of this invention is to provide means for housing the battery in such a way as to prevent unauthorized manipulation of the battery circuits.

Another object of this invention is to provide means for housing and locking the battery and the circuit switch so as to prevent tampering therewith and secure the setting of the switch in the desired circuit relation.

Another object of this invention is to provide means for cooperation between the switch and the battery housing, whereby both may be locked and to prevent unauthorized manipulation.

Further objects will appear from the detail description taken in connection with the accompanying drawings, in which:

Figure 1 is a plan view, partly in section, representing a battery and switch embodying this invention;

Figure 2 is a sectional view taken on line 2—2, Figure 3;

Figure 3 is a front view, partly in section;

Figure 4 is an end view, partly in section;

Figure 5 is a diagram of the circuit connections; and

Figure 6 is a detail of the forked contact.

Referring to the accompanying drawings, 1 designates a battery which may be of any usual type. This battery may be mounted in the car by placing the same within a box 2, usually constructed of wood or other suitable material. The battery may rest in the box 2 on suitable supports in the form of lugs 3, which may be of rubber or other suitable material and serve to space the battery from the floor of the box 2 so as to protect the same in case of accumulation of water or the like in the box 2. If the lugs 3 are made of rubber, then they also serve to cushion jolts and jars incident to travel. The box 2 is provided with a front 4 which, in turn, is provided with spacers 5 adapted to space the battery from the front of the box so as to make room for switch terminals and the like, as will be hereinafter more fully described. The spacers 5 as well as the sides and rear of the box 2 may be provided with spring bumpers 6 to space the battery from the sides of the box and to cushion any jars or shocks incident to traveling. The front 4 of the box 2 may be constructed of slate, wood or other suitable material, upon which the switch terminals may be mounted.

The box 2 is placed within a metal enclosure or outer box 7. The enclosure 7 may be provided with a lid 8 which may be suitably hinged as indicated at 9 to the body of the enclosure. Mounted on the front of the enclosure 7 is a switch box or enclosure 10 adapted to house the switch parts as will be more fully described hereinafter. The enclosures 7 and 10 may be constructed of tough material, such as steel, capable of resisting the ordinary efforts of a thief to penetrate the same. These enclosures when locked will then serve to protect the battery and the switch from unauthorized manipulation.

Extended terminals 11 and 12 connect the battery terminals with terminals 13 and 14 mounted on the front 4 of the battery box 2. These latter terminals pass through the front 4 into the enclosure 10, the enclosure 7 being cut away at that part enclosed by the enclosure 10. The terminals 11 and 12 are flexible and are permanently connected to the battery, so that corrosion at the connections is thereby eliminated.

Mounted in a bearing 15 on the switch enclosure 10 is a short shaft 16. This shaft is mounted for rotary movement in the bearing 15 and may be connected by means of a suitable connection 17 with a manipulative element 18 mounted in a convenient place for operation.

The shaft 16 is provided with a recess in which is mounted an insulating member 20 secured to the shaft 16 by means of a taper pin 21 or other suitable connection. The insulating member 20 has mounted therein and keyed thereto a stub shaft 22 which, in turn, carries a contact or switch arm 23. The terminal 14 comes through the front 4 at a point just opposite the contact 23 on the stub shaft 22. The terminal 14 carries a fork-shaped contact 24 extending into the enclosure 10 and embracing the contact 23 and the stub-shaft 22 as indicated in Figure 3. This fork-shaped contact serves to convey the current from the battery to the switch arm 23. The lower end of the stub shaft 22 carries another insulating member 25 exactly similar to the above-mentioned insulating member 20 and similarly connected to the stub shaft 22. This lower member 25 is connected by means of a metallic sleeve 26 and taper pins 27 to a third insulating member 28 exactly similar to the members 20 and 25. The member 28 carries a stub shaft 29 similar to the stub shaft 22 and carrying in a similar manner a second switch contact 30 similar to the contact 23. The contact 30 is in engagement with a fork-shaped contact 31 similar to the contact 24 and similarly mounted on the front 4 of the battery box. This contact 31 is connected by means of a connector 32 with the terminal 13, by means of which connections current may be conveyed to the switch arm 30. The stub-shaft 29 is capped at its lower end by an insulating member 33 provided with a shoulder adapted to receive a spring 34 bearing at its lower end against the bottom of the enclosure 10 and operating by its tension to press the various parts attached to the shaft 16 together so as to maintain the forked contacts 31 and 24 in firm engagement with their respective switch arms. It will be seen that the just described assemblage of elements provides an insulating shaft adapted to carry the switch contacts 23 and 30 while keeping the same insulated from each other and from the housing. At the same time provision is made for conveying the current to each of these switch arms individually. The switch arms 23 and 30 are adapted to cooperate with switch jaws 35 and 36 suitably mounted upon the inside of the enclosure 10 and insulated therefrom. There are four of these switch jaws, two of which are shown in Figure 3. The switch jaw 36 has connected thereto an exterior terminal 37 mounted on the side of the enclosure 10. The other two switch jaws are mounted in a similar manner on the front of the enclosure 10 and similarly connected to exterior terminals 38 and 39. One of these switch jaws 40 connected to the terminal 38 is shown in Figure 2. The switch jaw 35 is connected to the exterior terminal 41 by means of a resistance 42.

The enclosure 10 is provided with an upwardly extending flange 43 providing an opening which is covered by a part of the cover 8 when closed, into which opening an extension 44 on the cover 8 is adapted to extend when the cover is closed. This extension is provided with a slot 45 into which an arm 46 mounted on the shaft 16 is adapted to move when the switch moves to certain positions. When the arm 46 projects into the slot 45, the cover 8 is locked in closed position.

The connection 17 may be provided with a fixed enclosure 47 extending up to the element 18 and which may be provided adjacent the element 18 with a projection 48 provided with a suitable dial or indicator adapted to indicate the various positions of the element 18. This projection 48 may be provided with a series of perforations 49 adapted to receive a locking pin 50 operated by a suitable key lock 51 mounted in the element 18. Operation of the lock 51 will project the pin 50 into one of the perforations 49 or withdraw it therefrom according to the direction in which the key is turned. This lock, therefore, serves to lock the element 18 and, therefore, the switch in any one of a series of positions. When the element 18 is turned to the position shown in Figure 1, the switch arms 23 and 30 will engage the jaws 35 and 36 respectively. When the element 18 is turned to the position marked "6" in Figure 1, the arms 23 and 30 will contact with the jaws connected respectively to the terminals 38 and 39. In the latter position the full battery voltage, usually six volts, will appear at the terminals 38 and 39. In the former position the terminals 37 and 41 will connect to the battery through the resistance 42. In a position of the element 18 intermediate the two just described, namely the position marked "Off", Figure 1, the arms 23 and 30 will be free of contact with any of the switch jaws and all circuits will be open.

The circuit connections used with this device may be as shown in Figure 5. The terminal 39 is shown grounded. The terminal 38 is connected through the starting switch 52 to the motor 53. This terminal is also connected through a branch circuit 54 to lamps 55 which may be the head-lights and other lights about the car. The terminal 41 may be connected to a parking light 56 or other similar signal ordinarily used only while a car is standing still. It will be seen that when the switch is set in the position marked "6", Figure 1, the full battery voltage will be connected to the starting motor 53 and also to the various lights and other devices 55. When the switch is set in the position marked "2", Figure 1, the battery will be connected to the parking light 56 through the resistance 42 which is calculated to provide about two volts at the parking lamp. In either of these positions, as well as in the "Off" position, the element 18 may be locked so that the switch is secured against unauthorized manipulation.

It will be seen, therefore, that in accordance with this invention a device is provided which will insure protection of an automobile in the different conditions in which it is liable to be left by itself. When ordinarily parked in the day time, the car may be left with the switch in the "Off" position and locked. In this case not only will the switch be protected against unauthorized manipulation but the battery itself will be completely enclosed and having its cover locked in closed position it will be completely protected against tampering therewith by any unauthorized person. It is, therefore, impossible for any one to run separate wires from the battery to the motor, for instance, so as to be able to start the car. When the car is parked at night, the switch may be left in the position marked "2" and locked. In this case the parking light 56 will be left burning while all other circuits will be interrupted. The same measure of protection is afforded in this case as in the case just described. When it is desired to drive the car, the switch will, of course, be moved to the "6" position and full voltage will be applied to all the necessary circuits required.

It will be seen, therefore, that while the switch may be used so as to determine any one of a plurality of battery circuits, it may be locked in such position and at the same time the battery enclosure will be locked against unauthorized manipulation.

It is obvious that various changes may be made in details of construction without departing from the spirit of this invention; it is, therefore, to be understood that this invention is not to be limited to the specific details shown and described.

Having thus described the invention, what is claimed is:

1. In an automobile, a battery, a battery box, a switch on said box and a current limiting device associated with said battery, a plurality of sets of circuit terminals mounted on said box, and means to manipulate said switch to connect certain of said sets of terminals to the battery through the limiting device, to the exclusion of other of said sets.

2. In an automobile, a battery, a battery box, a switch on said box, a current limiting device associated with said battery, circuit terminals mounted on said box, and means to manipulate said switch to connect certain of said terminals to the battery through the limiting device to the exclusion of the remaining terminals.

3. In an automobile, a battery, a battery box and cover, a switch on said box and a current limiting device associated with said battery, a plurality of sets of circuit terminals mounted on said box, means to manipulate said switch to connect certain of said sets of terminals to the battery through the limiting device, to the exclusion of other of said sets, and means secured against unauthorized manipulation for locking said switch and said cover.

4. In an automobile, a battery, a battery box, a switch on said box, a current limiting device associated with said battery, circuit terminals mounted on said box, and means to manipulate said switch to connect certain of said terminals to the battery through the limiting device to the exclusion of the remaining terminals, and means secured against unauthorized manipulation for locking said switch and said cover.

5. In an automobile, a battery, a battery box, a switch on said box, and a current limiting device associated with said battery, a plurality of sets of circuit terminals mounted on said box, and a lock handle for manipulating said switch thereby to connect certain of said sets of terminals to the battery through the limiting device to the exclusion of other of said sets.

6. In an automobile, a battery, a battery box, a switch on said box, a current limiting device associated with said battery, circuit terminals mounted on said box, and means comprising a locking element to manipulate said switch to connect certain of said terminals to the battery through the limiting device to the exclusion of the remaining terminals.

In testimony whereof I affix my signature this 26th day of November, 1923.

CONRAD A. WELLING.